United States Patent [19]
Watanabe et al.

[11] Patent Number: 5,094,691
[45] Date of Patent: Mar. 10, 1992

[54] TUNGSTIC OXIDE-STANNIC OXIDE COMPOSITE SOL AND METHOD OF PREPARING THE SAME

[75] Inventors: Yoshitane Watanabe; Keitaro Suzuki, both of Funabashi, Japan

[73] Assignee: Nissan Chemical Industries, Ltd., Tokyo, Japan

[21] Appl. No.: 605,424

[22] Filed: Oct. 30, 1990

[30] Foreign Application Priority Data

Nov. 7, 1989 [JP] Japan .................................. 1-289410
Nov. 7, 1989 [JP] Japan .................................. 1-289542

[51] Int. Cl.$^5$ .............................................. C09D 1/00
[52] U.S. Cl. ................................. 106/286.4; 106/441; 106/450; 106/455; 106/479
[58] Field of Search ............... 106/286.4, 287.19, 479, 106/441, 450, 455

[56] References Cited

U.S. PATENT DOCUMENTS 3,634,286  6/1972  Yates ................................. 106/286.4

FOREIGN PATENT DOCUMENTS 57-122931  7/1982  Japan .................................. 106/479

Primary Examiner—Theodore Morris
Assistant Examiner—David M. Brunsman
Attorney, Agent, or Firm—Oliff & Berridge

[57] ABSTRACT

An aqueous sol of colloidal particles of tungstic oxide ($WO_3$)-stannic oxide ($SnO_2$) composite having a particle size of from 2 to 7 millimicrons is prepared by blending an aqueous solution of tungstic acid and an aqueous solution of a stannate in a weight ratio of from 0.5 to 100 as $WO_3/SnO_2$. Where the $WO_3$—$SnO_2$ composite sol in an amount of from 2 to 100 parts by weight as the total of $WO_3$ and $SnO_2$ is blended with a sol of a 3- to 5 valent metal oxide having a particle size of from 4 to 50 millimicrons in an amount of 100 parts by weight as the metal oxide, a modified metal oxide sol collidal particles having a size of 4.5 to 60 millimicrons as surface-coated with the tungstic oxide ($WO_3$)-stannic oxide ($SnO_5$) composite colloidal particles is prepared.

12 Claims, No Drawings

TUNGSTIC OXIDE-STANNIC OXIDE COMPOSITE SOL AND METHOD OF PREPARING THE SAME

FIELD OF THE INVENTION

The present invention relates to colloidal particles composed of tungstic oxide ($WO_3$)-stannic oxide ($SnO_2$) composite and having a particle size of from 2 to 7 millimicrons and a sol of colloidal particles of a 3- to 5-valent metal oxide as surface-coated with the colloidal particles of the composite and having a particle size of approximately from 4.5 to 60 millimicrons, as well as to methods of preparing the sols.

PRIOR ART

Sols of various metal oxides have already been known. For instance, a sol of a metal oxide having a high refractive index has been employed as a component of a coating agent to form a thin and hard coat which is applied to the surface of a plastic lens for the purpose of improving the surface thereof, with popularization of plastic lens in these days.

Precisely, JP-B-63-37142 (the term "JP-B" as used herein means an "examined Japanese patent publication") discloses a transparent, thin and hard coat comprising from 5 to 80% by weight of inorganic particles having a particle size of from 1 to 300 millimicrons and composed of one or more of oxides of metals selected from the group consisting of Al, Ti, Zr, Sn and Sb.

A stable sol of tungstic oxide only is unknown. However, JP-A-54-52686 (the term "JP-A" as used herein means an "unexamined published Japanese patent application") discloses a colloidal solution comprising a tungsten compound, a silicon compound and an alkali metal ion or ammonium ion in a molar ratio of (4 to 15)/(2 to 5)/1 as $WO_3/SiO_2/M_2O$ (wherein M represents an alkali metal or ammonium). The disclosed sol is obtained by addition of a silicate.

Further, JP-B-50-40119 discloses a method of producing a silicic acid-antimonic acid composite sol or a silicic acid-stannic acid composite sol comprising mixing an aqueous solution of an alkali silicate or a silicic acid sol with an aqueous solution of an alkali antimonate or an alkali stannate in a molar ratio of (2 to 1000)/1 as Si/Sb or Si/Sn to form a liquid mixture, then decationizing said liquid mixture through an ion exchanger in a form of an acid.

However, where the conventional metal oxide sols, especially the cationic metal oxide sol, are used as a component of a coating agent to form a thin and hard coat, not only the stability of the resulting coating agent is insufficient but also the transparency, adhesiveness and weather-resistance of the hardened coat to be formed from the coating agent are insufficient. Additionally, where $Sb_2O_5$ sol is used as a component of a coating agent to form a thin and hard coat, the hardened coat from the $Sb_2O_5$ sol would no more be effective for improving the refractive index characteristic of the coated plastic lens substrate when the plastic lens substrate has a refractive index of 1.6 or more. This is because $Sb_2O_5$ has a refractive index of from 1.65 to 1.70 or so. As mentioned above, the sol of tungstic oxide as illustrated in JP-A-54-52686 is obtained by adding a silicate to an aqueous solution of tungstic acid to be obtained by decationizing an aqueous solution of a tungstate, but the sol is stable only under a strong acidic condition. Where it is used as a component of a coating agent to form a thin and hard coat, the effect of improving the refractive index characteristic of the coat is low.

On the other hand, the silicic acid-stannic acid composite sol as illustrated in JP-B-50-40119 is obtained by decationizing the liquid mixture composed of an alkali silicate and an alkali stannate. However, where the composite sol is used as a component of a coating agent to form a thin and hard coat, the effect of improving the refractive index characteristic of the coat is also low.

SUMMARY OF THE INVENTION

The object of the present invention is to provide a stable sol of colloidal particles of metal oxides having a high refractive index, especially of 1.7 or more.

Another object of the present invention is to provide a metal oxide composite sol which can be used as a component to be incorporated into a coating composition to form a thin and hard coat for improving the property of the hard coat film to be applied to the surface of a plastic lens.

DISCLOSURE OF MEANS

In accordance with the present invention, there is provided a stable tungstic oxide ($WO_3$)-stannic oxide ($SnO_2$) composite sol in which colloidal particles composed of tungstic oxide ($WO_3$)-stannic oxide ($SnO_2$) composite and having a particle size of from 2 to 7 millimicrons and a weight ratio of $WO_3/SnO_2$ of being from 0.5 to 100 are stabilized with an alkali metal ion, ammonium ion or soluble amine in a ratio of from 0.01 to 0.7 mol to mol of the total of tungstic oxide ($WO_3$) and stannic oxide ($SnO_2$) in a liquid medium, the total content of said tungstic oxide ($WO_3$) and stannic oxide ($SnO_2$) in the sol being from 0.5 to 40% by weight.

As one preferred embodiment, the metal oxide composite sol of the invention is a stable sol composed of modified metal oxide colloidal particles having a particle size of from 4.5 to 60 millimicrons and formed by coating the surfaces of colloidal particles as cores of an oxide of a metal having a valence of 3, 4 or 5, the particles having a particle size of from 4 to 50 millimicrons, with colloidal particles composed of tungstic oxide ($WO_3$)-stannic oxide ($SnO_2$) composite and having a weight ratio of from 0.5 to 100 as $WO_3/SnO_2$ and a particle size of from 2 to 7 millimicrons, the total content of all the metal oxides being from 2 to 50% by weight.

The tungstic oxide ($WO_3$)-stannic oxide ($SnO_2$) composite sol of the present invention is prepared substantially by blending an aqueous solution of tungstic acid to be obtained by treating an aqueous solution containing a water-soluble tungstate in an amount of from 0.1 to 15% by weight as $WO_3$ with a cationic exchanger in hydrogen form, and an aqueous solution containing a water-soluble stannate in an amount of from 0.1 to 30% by weight as $SnO_2$, in a proportion of from 0.5/1 to 100/1 as a weight ratio of $WO_3/SnO_2$ based on the aqueous solutions, at a temperature of 0° C. to 100° C., and optionally, further concentrating the resulting sol as obtained by the blending operation.

The other sol of the invention, which is composed of modified metal oxide colloidal particles having a particle size of from 4.5 to 60 millimicrons and surface-coated with colloidal particles of tungstic oxide ($WO_3$)-stannic oxide ($SnO_2$) composite, is prepared substantially by blending a sol of colloidal particles of an oxide of a metal having a valence of 3, 4 or 5 in an amount of 100 parts by weight as the metal oxide, the sol having a concentration of from 0.5 to 50 % by weight as the metal oxide and the colloidal particles having a particle size of from 4 to 50 millimicrons, and a sol of colloidal particles of tungstic oxide ($WO_3$)-stannic oxide ($SnO_2$) composite in an amount of from 2 to 100 parts by weight as the total of $WO_3$ and $SnO_2$, the sol having a concentration of from 0.5 to 40 % by weight as the total of $WO_3$ and $SnO_2$ and the colloidal particles having a particle size of from 2 to 7 millimicrons and a weight ratio of from 0.5 to 100 as $WO_3/SnO_2$, at a temperature of 0° to 100° C., and optionally, further condensing the resulting sol as obtained by the blending operation.

DETAILED EXPLANATION OF MEANS

As examples of water-soluble tungstates and water-soluble stannates to be used in preparation of the tungstic oxide ($WO_3$)-stannic oxide ($SnO_2$) composite sol of the present invention, there are mentioned alkali metal, ammonium or water-soluble amine tungstates and stannates. As preferred examples of alkali metals, ammoniums and amines to be used for the purpose, there are mentioned Li, Na, K, Rb, Cs, $NH_4$, as well as alkylamines such as ethylamine, triethylamine, isopropylamine, n-propylamine, isobutylamine, diisobutylamine or di-2-ethylhexylamine; aralkylamines such as benzylamine; alicyclic amines such as piperidine; and alkanolamines such as monoethanolamine or triethanolamine. In particular, preferred are sodium tungstate $Na_2WO_4.2H_2O$ and sodium stannate $Na_2SnO_3.3H_2O$. Additionally, those prepared by dissolving tungstic oxide, tungstic acid or stannic acid in an aqueous solution of an alkali metal oxide may also be used.

The cationic exchanger in hydrogen-form to be used in the present invention, any conventional one is preferred to. Advantageously, a cation exchanger in hydrogen form resin is available as a commercial product. As the case may be, the alkali metal hydroxides, ammonium hydroxides and amines to be used in the present invention may also be commercial products. As examples of usable alkali metal hydroxides, there are mentioned sodium hydroxide, potassium hydroxide and lithium hydroxide.

The aqueous solution of tungstic acid to be used in the present invention may easily be obtained by treating an aqueous solution of the above-mentioned tungstate with the above-mentioned cation-exchange resin at a temperature of 100° C. or lower, preferably at room temperature to 60° C. or so. As the aqueous solution of tungstic acid is colloidal and is easy to gel, it is preferably prepared just before use for gellation. As the aqueous solution of the above-mentioned tungstate to be used for preparing the aqueous solution of tungstic acid, one having a concentration of from 0.1 to 15% by weight as $WO_3$ is preferred. The aqueous solution of tungstic acid to be prepared therefrom is preferably one also having a concentration of from 0.1 to 15% by weight or so as $WO_3$.

As the aqueous solution of the stannate to be used in the present invention, one having an $SnO_2$ concentration of from 0.1 to 30% by weight or so is preferred. However, the concentration may be higher than the said range. As the case may be, a solid stannate may also be used.

In accordance with the present invention, preparation of the tungstic oxide ($WO_3$)-stannic oxide ($SnO_2$) composite sol is effected by blending the above-mentioned aqueous solution of stannate. The blending is preferably effected with fully stirring, at a temperature higher than the freezing temperature of the liquid and up to 100° C., preferably at room temperature to 60° C. or so. Regarding the amounts of the liquids to be blended, the weight ratio of $WO_3/SnO_2$ may be from 0.5/1 to 100/1. The blending may be finished in 5 to 100 minutes or so, preferably in 30 to 60 minutes or so. The mixed liquid to be obtained after the blending generally contains the above-mentioned alkali metal ion, ammonium ion and amine. Where the alkali metal atom, $NH_4$ or amine molecule is represented by M, the molar ratio of $M_2O/(WO_3+SnO_2)$ in the mixed liquid to be obtained, or the ratio of the molar number of $M_2O$ to be in the mixed liquid to the total molar number of $WO_3$ and $SnO_2$ therein, is approximately from 0.01/1 to 0.44/1.

In order to obtain a more stable tungstic oxide ($WO_3$)-stannic oxide ($SnO_2$) composite sol, the molar ratio of $M_2O/(WO_3+SnO_2)$ in the mixed liquid as obtained by the above-mentioned blending is desirably adjusted to fall within the range of approximately from 0.02/1 to 0.7/1. As a method of elevating the above-mentioned molar ratio of the mixed liquid to be obtained by the blending operation, alkali metal hydroxides, ammonium oxide or amines may be added to the mixed liquid. Alternatively, after the above-mentioned mixed liquid has been treated with a cation exchanger in hydrogen form resin, alkali metal hydroxides, ammonium hydroxides or amines may be added to the treated liquid so that the molar ratio of $M_2O/(WO_3+SnO_2)$ in the liquid may be within the range of from 0.02/1 to 0.7/1.

The colloidal particles composed of $WO_3$—$SnO_2$ composite to be contained in the tungstic oxide ($WO_3$)-stannic oxide ($SnO_2$) composite sol, which is prepared by the above-mentioned blending operation optionally followed by the subsequent molar adjustment operation, can be observed with an electronic microscope and, in general, the particle size thereof is 7 millimicrons or less, preferably from 2 to 5 millimicrons.

Where the concentration of the tungstic oxide ($WO_2$)-stannic oxide ($SnO_2$) composite sol as obtained by the above-mentioned method is desired to be elevated, any conventional concentration method, such as vaporization method or ultrafiltration method, may be employed. In particular, preferred is ultrafiltration method. In the concentration procedure, the temperature of the sol is desired to be kept at about 100° C. or lower, especially at 60° C. or lower. However, too much concentration of the sol to have a high concentration of 40% by weight or more as the total content of $WO_3$ and $SnO_2$ in the concentrated sol must be evaded since the stability of the resulting sol is lost. A practically preferred concentration of the sol is 2% by weight or more, especially preferably from 10 to 30% by weight or so.

The aqueous sol composed of the preferred tungstic oxide ($WO_3$)-stannic oxide ($SnO_2$) composite obtained as mentioned above generally has a pH value of from 1 to 9, and it is a colorless transparent or almost transparent liquid. It is stable for 3 months or more at room temperature and for one month or more even at 60° C., without forming any precipitate in the sol. Further, the sol is neither thickened nor gelled.

By substituting water in the above-mentioned aqueous sol by a hydrophilic organic solvent, a hydrophilic organic solvent sol, which is called an organo-sol, is obtained. As examples of hydrophilic organic solvents usable for the purpose, there are mentioned lower alcohols such as methyl alcohol, ethyl alcohol and isopropyl alcohol; linear amides such as dimethylformamide and N,N'-dimethylacetamide; cyclic amides such as N-methyl-2-pyrrolidone; and glycols such as ethyl cellosolve, butyl cellosolve and ethylene glycol.

Substitution of water by the above-mentioned hydrophilic organic solvent may easily be effected by any known method, for example, by distillation substitution method or ultrafiltration method. Where the aqueous sol has a higher pH value, it is recommended to add a hydroxycarboxylic acid, such as lactic acid, tartaric acid, citric acid, gluconic acid, malic acid or glycolic acid, to the aqueous sol, in an amount of about 30% by weight or less to the total of $WO_3$ and $SnO_2$, before or during the substitution procedure. Irrespective of the presence or absence of the hydroxycarboxylic acid, the temperature of the sol is desired to be about 100° C. or lower, especially 60° C. or lower, also in the step of substituting the medium of the sol.

The colloidal particles of the tungstic oxide ($WO_3$)-stannic oxide ($SnO_2$) composite sol obtained as above are bonded to the surfaces of colloidal particles of a sol of an oxide of a metal having a valance of 3, 4 or 5, such as $Al_2O_3$, $Y_2O_3$, $Sb_2O_3$, $In_2O_3$, $Bi_2O_3$, $TiO_2$, $ZrO_2$, $SnO_2$, $CeO_2$, $TeO_2$, $Sb_2O_5$, $Nb_2O_5$ or $Ta_2O_5$, whereby the surfaces of the latter colloidal particles are coated with the former colloidal particles of the tungstic oxide ($WO_3$)-stannic oxide ($SnO_2$) composite to give modified colloidal particles of the 3- to 5-valent metal oxide as so modified that the surfaces thereof are to have the property of the tungstic oxide ($WO_3$)-stannic oxide ($SnO_2$) composite. The thus modified colloidal particles are obtained in the form of a sol as stably dispersed in the liquid medium.

The colloidal particles of the above-mentioned 3- to 5-valent metal oxide to be employed may easily be prepared by any known method, for example, by a so-called ion-exchange method, peptization method, hydrolysis method or reaction method, as a form of a sol of colloidal particles having a particle size of approximately from 4 to 50 millimicrons.

As examples of the above-mentioned ion-exchange method, there are mentioned a method of treating an acidic salt of the metal with a cation exchanger in hydrogen form resin, and a method of treating a basic salt of the metal with a anion-exchange resin in hydroxide form. As an example of the above-mentioned peptization method, there is mentioned a method where an acidic salt of the metal is neutralized with a base or a basic salt of the metal is neutralized with an acid to give a gel and thereafter the gel is washed and then peptized with an acid or base. As examples of the above-mentioned hydrolysis method, there are mentioned a method of hydrolyzing an alkoxide of the metal, and a method of hydrolyzing a basic salt of the metal under heat followed by removing the unnecessary acid. As an example of the above-mentioned reaction method, there is mentioned a method of reacting a powder of the metal with an acid.

The medium of the metal oxide sol may be any one of water and hydrophilic organic solvents. Preferred is an aqueous sol containing water as the medium. The pH value of the sol is preferably such that may stabilize the sol and is, in general, from 1 to 9 or so. So far as the objects of the present invention can be attained, the metal oxide sol may contain any desired components, for example, alkaline substances, acidic substances or hydroxycarboxylic acids for stabilizing the sol. The concentration of the metal oxide sol to be employed in the present invention may be approximately from 0.5 to 50% by weight as the metal oxide, but the concentration is preferably lower, more preferably from 1 to 30% by weight. So far as the stable sol of the present invention is obtained, a mixture of two or more kinds of the above-mentioned sols can be employed.

The sol of colloidal particles of the 3- to 5-valent metal oxide as modified with the colloidal particles of the tungstic oxide ($WO_3$)-stannic oxide ($SnO_2$) composite may be prepared by blending the 3- to 5-valent metal oxide sol in an amount of 100 parts by weight as the metal oxide and the tungstic oxide ($WO_3$)-stannic oxide ($SnO_2$) composite sol in an amount of from 2 to 100 parts by weight as the total of $WO_3$ and $SnO_2$ of the sol, preferably with strongly stirring. The blending is preferably effected at a temperature of 0° C. to 100° C., more preferably at room temperature to 60° C. The blending may be finished in 5 to 100 minutes, preferably in 30 to 60 minutes. It is preferred that the concentration of the tungstic oxide ($WO_3$)-stannic oxide ($SnO_2$) composite sol and that of the 3- to 5-valent metal oxide sol to be blended are appropriately selected before blending so that the sol of the modified colloidal particles to be obtained by the blending may have a concentration of from 2 to 40% by weight as the total of the 3- to 5-valent metal oxide and $WO_3$ and $SnO_2$, and thereafter the both sols thus selected are blended. However, if the concentration of the sol to be obtained by the blending is desired to be elevated higher, the sol may be concentrated up to at most about 50% by weight by any conventional method, for example, by evaporation method or ultrafiltration method.

The modified colloidal particles in the sol as obtained by the above-mentioned blending may be observed with an electronic microscope and have a particle size of approximately from 4.5 to 60 millimicrons. The sol obtained by the blending has a pH value of approximately from 1 to 9 and is stable. Where the pH value of the sol is desired to be adjusted, the above-mentioned alkali metal or ammonium hydroxide or the above-mentioned amine or hydroxycarboxylic acid may be added to the sol after the blending operation or optionally after the concentration operation, whereupon the pH value of the resulting sol may be within the scope of approximately from 1 to 9. In particular, practically preferred is a sol having a concentration of from 10 to 40% by weight as the total of the 3- to 5-valent metal oxide and $WO_3$ and $SnO_2$.

Where the modified metal oxide sol as obtained by the above-mentioned blending is an aqueous sol, the water medium in the aqueous sol may be substituted by a hydrophilic organic solvent to give an organo-sol. Such substitution may be effected by any conventional method, for example, by distillation method or ultrafiltration method. As examples of hydrophilic organic solvents usable for the purpose, there are mentioned lower alcohols such as methyl alcohol, ethyl alcohol or isopropyl alcohol; linear amides such as dimethylformamide or N,N'-dimethylacetamide; cylcic amides such as N-methyl-2-pyrrolidone; and glycols such as ethyl cellosolve, butyl cellosolve or ethylene glycol.

It has been found that both the colloidal particles of the tungstic oxide ($WO_3$-stannic oxide ($SnO_2$) composite of the present invention and the modified colloidal particles of the 3-to 5-valent metal oxide whose surfaces have been coated with said $WO_3$—$SnO_2$ composite colloidal particles of the present invention are ones as negatively charged in the respective sols. As the surfaces of the colloidal particles of the above-mentioned 3- to 5-valent metal oxides, except those of $Sb_2O_5$, are positively charged, it is considered that the negatively charged colloidal particles of the tungstic oxide ($WO_3$)-stannic oxide ($SnO_2$) composite would be electrically attracted to the surfaces of the positively charged colloidal particles by the above-mentioned blending procedure so that the colloidal particles of the tungstic oxide ($WO_3$)-stannic oxide ($SnO_2$) composite are bonded to the surfaces of the positively charged colloidal particles by chemical bond and, as a result, the surfaces of the positively charged particles as cores are coated with the tungstic oxide ($WO_3$)-stannic oxide ($SnO_2$) composite to thereby give modified 3-to 5-valent metal oxide colloidal particles. However, $Sb_2O_5$ colloidal particles are not charged positively. In the case, therefore, it is considered that colloidal particles of the tungstic oxide ($WO_3$)-stannic oxide ($SnO_2$) composite would be attracted to the surfaces of the particles by any other force than the electrostatic attractive force of the particles themselves whereby the colloidal particles of the tungstic oxide ($WO_3$)-stannic oxide ($SnO_2$) composite are bonded to the surfaces of the $Sb_2O_5$ colloidal particles. Where the sol of the negatively charged colloidal particles thus formed is blended with a well known silica sol which is negatively charged, a stable mixture composed of both sols is obtained without coagulation of the colloidal particles. The fact indicates that both the colloidal particles of the tungstic oxide ($WO_3$)-stannic oxide ($SnO_2$) composite and the modified colloidal particles of the 3- to 5- valent metal oxide as surface-coated with the former particles are colloidal particles as sufficiently negatively charged enough to maintain a stable sol.

However, when the sol of the colloidal particles composed of the 3- to 5-valent metal oxide and having a particle size of from 4 to 50 millimicrons is blended with the sol of the colloidal particles of the tungstic oxide ($WO_3$)-stannic oxide ($SnO_2$) composite, if the total amount of $WO_3$ and $SnO_2$ is less than 2 parts by weight to 100 parts by weight of the said 3- to 5-valent metal oxide, a stable sol could not be obtained. This may be considered because, if the amount of the colloidal particles of the tungstic oxide ($WO_3$)-stannic oxide ($SnO_2$) composite is insufficient, coating of the surfaces of the colloidal particles as cores of the 3- to 5-valent metal oxide with the colloidal particles of the composite would be insufficient so that the formed colloidal particles easily coagulate and the formed sol is thereby made unstable. Accordingly, the amount of the colloidal particles of the tungstic oxide ($WO_3$)-stannic oxide ($SnO_2$) composite to be blended must be more than the minimum amount necessary for forming a stable sol of the modified colloidal particles of the 3- to 5-valent metal oxide, although it may be smaller than the amount necessary for completely covering all the surfaces of the colloidal particles of the metal oxide. Where the colloidal particles of the tungstic oxide ($WO_3$)-stannic oxide ($SnO_2$) composite are used in an amount more than the necessary amount for the surface-coating, in the blending operation, the resulting sol to be obtained is merely a stable mixture of sols composed of the sol of the colloidal particles of the tungsten oxide ($WO_3$)-stannic oxide ($SnO_2$) composite and the sol of the modified colloidal particles of the 3- to 5-valent metal oxide.

Where the colloidal particles of the 3- to 5-valent metal oxide are modified by coating the surfaces thereof, the amount of the colloidal particles of the tungstic oxide ($WO_3$)-stannic oxide ($SnO_2$) composite to be used is preferably 100 parts by weight or less as the total of $WO_3$ and $SnO_2$ in the composite sol to 100 parts by weight of the metal oxide.

The preferred aqueous sol of the metal oxide as modified in accordance with the present invention has a pH value of from 1 to 9. If the pH value is less than 1, such a sol is often unstable. On the other hand, if it is more than 9, the tungstic oxide ($WO_3$)-stannic oxide ($SnO_2$) composite which is bonded as a coating onto the surfaces of the colloidal particles as cores of the 3, 4 or 5 valent metal oxide would easily dissolve out into the liquid. Further, if the total concentration of the 3- to 5-valent metal oxide, $WO_3$ and $SnO_2$ in the sol of the modified colloidal particles of the metal oxide is more than 50% by weight, the sol is also often unstable. The preferred concentration as industrial products is approximately from 10 to 40% by weight.

Where the above-mentioned 3- to 5-valent metal oxide sol and the above-mentioned tungstic oxide ($WO_3$)-stannic oxide ($SnO_2$) composite sol are blended, if both of the metal oxide concentration and the total concentration of $WO_3$ and $SnO_2$ in the sols are more than 50% by weight, gellation would occur unfavorably during the blending. Therefore, employment of such sols is unfavorable. It is rather preferred that the concentration of the sols to be blended is lower. However, if the concentration is too low, the amount of the liquid to be removed for concentrating the obtained sol would inconveniently increase. If the blending of the two sols is effected at a higher temperature than 100° C., the colloidal particles of the tungstic oxide ($WO_3$)-stannic oxide ($SnO_2$) composite would often be hydrolyzed.

Where $SnO_2$ sol, $ZrO_2$ sol, $TiO_2$ sol, $Sb_2O_5$ sol or the like is employed as the 3- to 5-valent metal oxide sol, a sol of modified colloidal particles of the metal oxide of the present invention, which has a sufficient stability, a pertinent particle size of the colloidal particles and a pertinent refractive index of the same particles, may be obtained.

Where the sol of the colloidal particles of the tungstic oxide ($WO_3$)-stannic oxide ($SnO_2$) is prepared not by the preferred method, only a practically useless one could be obtained.

The stability of the sol to be obtained by blending an aqueous solution of tungstic acid to be obtained by treating an aqueous solution of a tungstate with a cation exchanger in hydrogen form resin, and an aqueous solution of a stannate in a proportion of from 0.5/1 to 100/1 as a weight ratio of $WO_3/SnO_2$, is considered to be caused by the phenomenon that the cation of the alkali mental, ammonium or amine as introduced into the reaction system along with the stannate acts, as a pair ion for stabilization, to the colloidal particles of the tungstic oxide ($WO_3$)-stannic oxide ($SnO_2$) composite resulted from bonding of colloidal particles of stannic oxide with colloidal particles or polyanionic oligomers of tungstic oxide, as formed by the blending, to thereby form stable colloidal particles. However, if the weight ratio of $WO_3/SnO_2$ in the sol obtained is less than 0.5, the sol is unstable when it is acidic. On the contrary, if it is more than 100, the sol is also unstable. On the other hand, if the amount of the cation of alkali metal, ammonium or amine to be in the sol is less than 0.01 as a molar ratio of the above-mentioned $M_2O/(WO_3+SnO_2)$, the sol is also unstable. If the molar ratio is more than 0.7, the sol would give a dry coat having a poor waterproofness. Therefore, such sols are practically unfavorable. The hydroxycarboxylic acid to be added to the aqueous sol of the invention having a high pH value for the purpose of forming the above-mentioned organo-sol is also effective for stabilizing the resulting sol. However, if the content of the acid in the sol is more than 30% by weight to the total of $WO_3$ and $SnO_2$ in the sol, such a sol would also give a dry coat having a poor water-proofness. The pH value of the sol varies in accordance with the amount of the alkali metal, ammonium, amine and hydroxycarboxylic acid therein. If the pH value of the sol is less than 1 (one), the sol is unstable. If it is more than 9, the colloidal particles of the tungstic oxide ($WO_3$)-stannic oxide ($SnO_2$) composite would often dissolve out into the liquid. If the total concentration of $WO_3$ and $SnO_2$ in the sol is more than 40% by weight, the sol is also unstable. If the said concentration is too small, the sol is practically useless. Accordingly, the concentration is preferably from 10 to 30% by weight as favorable industrial products.

In place of the method of the present invention, if an aqueous solution containing a tungstate and a stannate as dissolved therein is treated with a cation exchanger resin in hydrogen form, the colloidal particles to be formed would be too small, or stannic oxide ($SnO_2$) would often precipitate out. A method of forming a sol by adding the above-mentioned alkali metal oxide, ammonium hydroxide or amine to the liquid as obtained by treatment of the aqueous solution containing a tungstate and a stannate with a cation exchanger in hydrogen form resin is not efficient.

If the $WO_3$ concentration in the aqueous solution of tungstic acid to be used is less than 1.0% by weight, the concentration of the sol to be obtained would be too low so that removal of a large amount of water is necessary for concentrating the sol. Such is inefficient. On the contrary, if the $WO_3$ concentration of the aqueous solution of tungstic acid is more than 15% by weight, such aqueous solution is unstable and is often difficult to treat.

Where an ultrafiltration method is employed for concentrating the sol of the invention, the polyanion of tungstic oxide ($WO_3$) and other ultrafine particles as existing in the sol would pass through the ultrafilter along with water whereby the polyanion and ultrafine particles, which cause instability of the sol, can be removed from the sol. Since the aqueous sol of the colloidal particles of the tungstic oxide ($WO_3$)-stannic oxide ($SnO_2$) composite are often hydrolyzed to be dissolved out into the liquid medium or the oxides are often precipitated out thereinto at a temperature higher than 100° C., the reaction temperature in the above-mentioned treatment with a cation-exchange resin, blending and concentration is preferably 100° C. or lower. As a stable temperature which does not cause the said unfavorable changes, a reaction temperature of 60° C. or lower is preferred.

EXAMPLE 1

550 g of sodium tungstate $Na_2WO_4.2H_2O$ (first class grade chemical) was dissolved in 4850 g of water to prepare 5400 g of an aqueous solution of sodium tungstate. The aqueous solution had a specific gravity of 1.086, a pH value of 9.79 and a $WO_3$ content of 7.16% by weight.

Next, all of the aqueous solution was passed through a column filled with a cation exchanger in hydrogen form resin (Amberlite 120B, by Organo Co.) to obtain 5690 g of an aqueous solution of tungstic acid. The aqueous solution had a specific gravity of 1.068, a pH value of 1.60, a viscosity of 2.0 cp, a $WO_3$ content of 6.8% by weight and an $Na_2O$ content of 0.04% by weight, and it was an yellow transparent liquid. After allowed to stand at room temperature, the aqueous solution gelled after one hour.

On the other hand, sodium stannate $Na_2SnO_3.3H_2O$ (first class grade chemical) was dissolved in water to prepare an aqueous solution of sodium stannate having a specific gravity of 1.244, a pH value of 12.8, an $SnO_2$ content of 15.0% by weight and an $Na_2O$ content of 6.2% by weight.

Next, 505 g of the aqueous solution of sodium stannate was added to 5690 g of the fresh aqueous solution of tungstic acid with strong stirring, and the stirring was continued for 30 minutes at room temperature to prepare an aqueous sol of tungstic oxide ($WO_3$)-stannic oxide ($SnO_2$) composite of the present invention. The sol was almost colorless and transparent, though it assumed somewhat a slightly colloidal color. It had a specific gravity of 1.073, a pH value of 5.03, a viscosity of 1.5 cp, a $WO_3$ content of 6.25% by weight, an $SnO_2$ content of 1.22% by weight and an $Na_2O$ content of 0.54% by weight. By observation with an electronic microscope, the particle size of the colloidal particles in the sol was about 5 millimicrons. After stored in a closed system at room temperature, it was stable for 3 months or more. From the above-mentioned values, the weight ratio of $WO_3/SnO_2$ was calculated to be 5.12 and the molar ratio of $Na_2/(WO_3+SnO_2)$ to be 0.25.

EXAMPLE 2

3100 g of the aqueous sol as obtained in Example 1 was passed through a column filled with a cation exchanger in hydrogen form resin to give an aqueous sol of the present invention. It had a specific gravity of 1.062, a pH value of 1.53, a viscosity of 1.5 cp, a $WO_3$ content of 5.69% by weight, an $SnO_2$ content of 1.11% by weight and an $Na_2O$ content of 0.04% by weight. From the values, the molar ratio of $Na_2O/(WO_3+SnO_2)$ of the sol was calculated to be 0.02.

Next, 3400 g of the sol having a pH value of 1.53 was blended with 3095 g of the sol having a pH value of 5.03, as obtained in Example 1, to give an aqueous sol of the present invention. The thus obtained sol was almost colorless and transparent, though it assumed somewhat a colloidal color. It had a specific gravity of 1.068, a pH value of 2.36, a viscosity of 1.5 cp, a $WO_3$ content of 5.96% by weight, an $SnO_2$ content of 1.17% by weight and an $Na_2O$ content of 0.28% by weight. By observation with an electronic microscope, the particle size of the colloidal particles in the sol was about 5 millimicrons. The sol was stable for 3 months or more in the storage test at room temperature. From the above-mentioned values, the weight ratio of $WO_3/SnO_2$ was calculated to be 5.12 and the molar ratio of $Na_2O/(WO_3+SnO_2)$ to be 0.135.

Next, 6495 g of the sol having a pH value of 2.36 was concentrated by ultrafiltration to give 1840 g of a concentrated sol having a high concentration. The sol was also almost colorless and transparent, though it assumed somewhat a colloidal color. It had a specific gravity of 1.212, a pH value of 2.34, a viscosity of 2.5 cp, a $WO_3$ content of 17.1% by weight, an $SnO_2$ content of 3.93% by weight and an $Na_2O$ content of 0.88% by weight. By observation with an electronic microscope, the colloidal particle size was about 5 millimicrons; and by measurement by a dynamic light-scattering method (by the use of $N_4$ device by Coulter Electronics Inc. of USA), the particle size was 90 millimicrons. The high-concentration sol had a calculated weight ratio of $WO_3/SnO_2$ of 4.35 and a calculated molar ratio of $Na_2O/(WO_3+SnO_2)$ of 0.14. After the ultrafiltration, the $WO_3$ content in the resulting sol was reduced by about 20%. The reduction indicates that the non-filtered sol contained $WO_3$ polyanions and ultrafine particles capable of passing through the ultrafilter.

Where the high-concentration sol was tested, it was confirmed that the dispersibility of the sol in methanol was good and that the sol was stable for 3 months or more at room temperature. Next, the sol was dried and the light refractive index of the dried sol was measured to be 1.84.

EXAMPLE 3

5400 g of an aqueous solution of sodium tungstate having a $WO_3$ content of 7.16% by weight was passed through a column filled with a cation exchanger in hydrogen form resin to prepare 6135 g of an aqueous solution of tungstic acid. The aqueous solution has a specific gravity of 1.062, a pH value of 1.48, a viscosity of 2.5 cp, a $WO_3$ content of 6.16% by weight and an $Na_2O$ content of 0.03% by weight. Accordingly, the molar ratio of $Na_2O/WO_3$ was calculated to be 0.018.

Next, 765 g of an aqueous solution of sodium stannate ($SnO_2$ content; 15.0% by weight, $Na_2O$ content; 62% by weight) was added to 6135 g of the fresh solution of tungstic acid prepared above with strong stirring at room temperature, to give 6900 g of an aqueous sol of the present invention. The sol had a specific gravity of 1.073, a pH value of 6.72, a viscosity of 1.5 cp, a $WO_3$ content of 5.60% by weight, an $SnO_2$ content of 1.67% by weight and an $Na_2O$ content of 0.71% by weight. By calculation, the weight ratio of $WO_3/SnO_2$ was 3.35 and the molar ratio of $Na_2O/(WO_3+Sn_2)$ was 0.33.

Next, the sol was concentrated under reduced pressure by the use of a rotary evaporator to give 1610 g of a high-concentration aqueous sol. The high-concentration sol was almost colorless and transparent, though it assumed somewhat a slightly colloidal color. It had a specific gravity of 1.385, a pH value of 6.68, a viscosity of 2.6 cp, a $WO_3$ content of 24.0% by weight, an $SnO_2$ content of 7.14% by weight, and an $Na_2O$ content of 3.06% by weight. By observation with an electronic microscope, the colloidal particle size was about 5 millimicrons. In the storage test at room temperature, the sol was stable for 3 months or more.

EXAMPLE 4

22 g of n-propylamine and 19 g of tartaric acid were added to 3250 g of the aqueous sol having a specific gravity of 1.068 and pH value of 2.36 as obtained in Example 2, with stirring, to obtain an aqueous sol. The sol had a specific gravity of 1.067, pH value of 3.82, a viscosity of 1.5 cp, a $WO_3$ content of 5.88% weight, an $SnO_2$ content of 1.16% by weight, an $Na_2O$ content of 0.28% by weight, an amine content of 0.67% by weight and a tartaric acid content of 0.58% by weight. By calculation, the molar ratio of $(Na_2+(amine)_2O)/(WO_3+SnO_2)$ was 0.31 and the ratio of (tartaric acid)/$(WO_3+SnO_2)$ was 9.52% by weight.

Next, the sol was concentrated under reduced pressure with a rotary evaporator to obtain 970 g of a high-concentration aqueous sol. The sol was almost colorless and transparent, though it assumed somewhat a colloidal color. It had a specific gravity of 1.282, a pH value of 3.68, a viscosity of 2.3 cp, a $WO_3$ content of 1.99% by weight, an $SnO_2$ content of 3.93% by weight, an $Na_2O$ content of 0.95% by weight, an amine content of 2.27% by weight and a tartaric acid content of 1.97% by weight. The sol had a good dispersibility in methanol and was stable for 3 months or more at room temperature.

EXAMPLE 5

215 g of the aqueous sol having a specific gravity of 1.212 and a pH value of 2.34 as obtained in Example 2 was put in a rotary evaporator, and the medium of the sol was distilled out with continuously adding 3 liters of methanol thereto little by little under reduced pressure, whereby 376 g of a methanol sol where water of the aqueous sol was substituted by methanol was obtained. The sol was almost colorless and transparent, thought it assumed somewhat a colloidal color. It had a specific gravity of 0.932, a pH value of 3.46 (as a mixture (1/1 by weight) of the sol and water), a viscosity of 6.2 cp, a $WO_3$ content of 9.78% by weight, an $SnO_2$ content of 2.25% by weight and a water content of 7.5% by weight. The sol formed an extremely slight amount of a precipitate during storage, but the amount of the formed precipitate did not increase even after the storage period was prolonged. Accordingly, the sol was stable after storage for a long period of time.

EXAMPLE 6

300 g of the high concentration aqueous sol as obtained in Example 4 was also processed in the same manner as in Example 5, whereby the water medium in the sol was replaced by methanol to give 350 g of a methanol sol. The sol was almost colorless and transparent, though it assumed somewhat a colloidal color. It had a specific gravity of 0.978, a pH value of 5.28 (as a mixture (1/1 by weight) of the sol and water), a viscosity of 4.0 cp, a $WO_3$ content of 17.1% by weight, an $SnO_2$ content of 3.37% by weight, an $Na_2O$ content of 0.81% by weight, an n-propylamine content of 1.94% by weight, a tartaric acid content of 1.69% by weight and a water content of 3.5% by weight. After storage at room temperature for 3 months, it formed no precipitate and was stable.

EXAMPLE 7

240 g of sodium tungstate $Na_2WO_4.2H_2O$ was dissolved in 3200 g of water to prepare 3440 g of an aqueous solution of sodium tungstate ($WO_3$: 4.88% by weight). Next, the aqueous solution was passed through a column filled with a cation exchanger in hydrogen form resin to give 4450 g of an aqueous solution of tungstic acid (specific gravity: 1.033, pH: 1.53). 366 g of an aqueous solution of sodium stannate $Na_2SnO_3$ having an $SnO_2$ content of 15.0% by weight, as separately prepared, was blended with 3440 g of the aqueous solution of tungstic acid to give 3806 g of tungstic oxide ($WO_3$)-stannic oxide ($SnO_2$) composite sol (I) (specific gravity: 1.042, pH: 7.02). Next, this was passed through a column filled with a cation exchanger in hydrogen form resin to give 5860 g of an acidic tungstic oxide ($WO_3$)-stannic oxide ($SnO_2$) composite sol (I) (specific gravity: 1.032, pH: 1.82, $WO_3$: 2.87% by weight, $SnO_2$: 0.94% by weight, $WO_3/SnO_2$ by weight: 3.07). 5860 g of the acidic tungstic oxide ($WO_3$)-stannic oxide ($SnO_2$) composite sol (I) was blended with 413 g of the previously prepared aqueous solution of sodium stannate ($SnO_2$: 15.0%), to give 6273 g of a tungstic oxide ($WO_3$)-stannic oxide ($SnO_2$) composite sol (II) (specific gravity: 1.044, pH: 7.26). Next, this was passed through a column filled with a cation exchanger in hydrogen form resin to give 7556 g of the acidic tungstic oxide ($WO_3$)-stannic oxide ($SnO_2$) composite sol (II) (specific gravity: 1.032, pH: 2.07, $WO_3$: 2.22% by weight, $SnO_2$: 1.55% by weight, $WO_3/SnO_2$ by weight: 1.44). 7556 g of the acidic tungstic oxide ($WO_3$)-stannic oxide ($SnO_2$) composite sol (II) was blended with 445 g of the previously prepared aqueous solution of sodium stannate ($SnO_2$: 15.0%) to give 8001 g of a tungstic oxide ($WO_3$)-stannic oxide ($SnO_2$) composite sol (III) (specific gravity: 1.040, pH: 7.56). Next, 22000 g of water was added to the composite sol, which was then passed through a column filled with a cation exchanger in hydrogen form resin to give an acidic tungstic oxide ($WO_3$)-stannic oxide ($SnO_2$) composite sol (III) (specific gravity: 1.013, pH: 2.61, viscosity: 1.5 cp, $WO_3$: 0.77% by weight, $SnO_2$: 0.85% by weight, $WO_3/SnO_2$ by weight: 0.92). Further, 8.0 g of isopropylamine was added to 21.7 kg of the acidic composite sol (III) to obtain a tungstic oxide ($WO_3$)-stannic oxide ($SnO_2$) composite sol (IV). The sol had a specific gravity of 1.013, a pH value of 4.0, a viscosity of 1.3 cp, a $WO_3$ content of 0.77% by weight, an $SnO_2$ content of 0.85% by weight, a total content of ($WO_3+SnO_2$) of 1.62% by weight, a weight ratio of $WO_3/SnO_2$ of 0.92, an isopropylamine content of 0.037% by weight, and a molar ratio of (isopropylamine)$_2$O/($WO_3+SnO_2$) of 0.035. By observation with an electronic microscope, the colloidal particle size was 5 millimicrons or less. It was an almost transparent sol, assuming a slightly colloidal color.

EXAMPLE 8

This illustrates formation of aqueous $SnO_2$ sol (A), aqueous $Sb_2O_5$ sol (B) and aqueous $ZrO_2$ sol (C).

(1) Preparation of $SnO_2$ Sol (A)

200 g of a pale yellow and transparent aqueous stannic oxide ($SnO_2$) sol, which was obtained by reaction of a tin metal powder, an aqueous hydrochloric solution and an aqueous hydrogen peroxide solution and which had a specific gravity of 1.420, a pH value of 0.40, a viscosity (immediately after stirring) of 32 cp, an $SnO_2$ content of 33.0% by weight, an HCl content of 2.56% by weight, a particle size of spindle-shaped colloidal particles (as observed with an electronic microscope) of 10 millimicrons or less, a specific surface area of particles (as measured by BET method) of 120 m$^2$/g, a particle size (as calculated from the specific surface area) of 7.2 millimicrons and a particle size (as measured by a dynamic light-scattering method by the use of $N_4$ device by Coulter Electronics Inc. of USA) of 107 millimicrons, was dispersed in 1800 g of water, and 0.8 g of isopropylamine was added thereto. Next, the resulting liquid was passed through a column filled with a hydroxyl group-type anion-exchange resin to give 2240 g of an alkaline aqueous stannic oxide ($SnO_2$) sol (A). The sol (A) was stable and assumed a colloidal color, but it had an extremely high transparency. It had a specific gravity of 1.029, a pH value of 8.80, a viscosity of 1.4 cp, an $SnO_2$ content of 2.95% by weight and an isopropylamine content of 0.036% by weight.

(2) Preparation of $Sb_2O_5$ Sol (B)

A gel as obtained by the method proposed in JP-A-61-227918 where sodium antimonate was used as a raw material and reacted with hydrochloric acid was peptized with phosphoric acid, to give an aqueous $Sb_2O_5$ sol (B) having a specific gravity of 1.142, a pH value of 1.75, a viscosity of 5.6 cp, an $Sb_2O_5$ content of 13.4% by weight, an $Na_2O$ content of 0.0017% by weight and a particle size (as observed with an electronic microscope) of being from 5 to 15 millimicrons.

(3) Preparation of $ZrO_2$ Sol (C)

An aqueous solution of zirconium oxychloride was hydrolyzed to give a highly transparent and stable aqueous $ZrO_2$ sol (C). The sol had a specific gravity of 1.177, a pH value of 3.85, a viscosity of 5.6 cp, a $ZrO_2$ content of 22.1% by weight and a particle size (as observed with an electronic microscope) of 5 millimicrons.

EXAMPLE 9

This illustrates formation of a modified aqueous $SnO_2$ sol.

Precisely, 500 g of water was added to 420 g of a composite sol having a pH value of 2.36 as obtained in Example 2 to give diluted composite sol. This was then added to 2240 g of the previously prepared aqueous $SnO_2$ sol (A) with strong stirring, and the stirring was continued for 30 minutes to give 3160 g of a stable modified low-concentration aqueous $SnO_2$ sol. The sol had a specific gravity of 1.030, a pH value of 4.65, a viscosity of 1.4 cp and a weight ratio of ($WO_3+SnO_2$)/$SnO_2$ of 0.45. It was highly transparent, though it assumed a colloidal color. It had a particle size (as observed with an electronic microscope) of about 10 millimicrons, a specific surface area of 104 m$^2$/g, a particle size (as calculated from the specific surface area) of 8.7 millimicrons, and a particle size (as measured by a dynamic light-scattering method by the use of $N_4$ device by Coulter Electronics Inc. of USA) of 108 millimicrons.

Next, 3160 g of the modified low-concentration aqueous $SnO_2$ sol thus prepared was concentrated with an ultrafiltration apparatus equipped with an ultrafilter having a fractionating molecular weight of 50,000, to give 517 g of a modified high-concentration aqueous $SnO_2$ sol. The sol had a specific gravity of 1.172, a pH value of 4.20, a viscosity of 2.8 cp, a total $SnO_2$ content of 13.67% by weight, a $WO_3$ content of 3.6% by weight, an $Na_2O$ content of 0.19% by weight, an isopropylamine content of 0.14% by weight and a weight ratio of ($WO_3+SnO_2$)/$SnO_2$ of 0.35. The sol was highly transparent, though it assumed a colloidal color. It was stable for 3 months or more at room temperature. From the $WO_3$ content of the sol before and after ultrafiltration, it was confirmed that $WO_3$ was removed from the original sol in an amount of about 20% of the original $WO_3$ content (in the non-ultrafiltered sol) along with water by ultrafiltration.

The high-concentration sol showed an excellent dispersibility in methanol. By blending it with a general anion-charged silica sol, a stable mixture of sols was obtained. The dried film formed from the high-concentration sol had a refractive index of 1.84.

EXAMPLE 10

This example illustrates formation of a modified aqueous $SnO_2$ sol.

Precisely, 500 g of water was added to 420 g of the composite sol having a pH value of 2.36 as prepared in Example 2 ($WO_3$: 5.96% by weight, $SnO_2$: 1.17% by weight, ($WO_3+SnO_2$): 7.13% by weight) to give a diluted composite sol. This was added to 3390 g of an alkaline aqueous stannic oxide ($SnO_2$) sol (A) as prepared in Example 8, with strong stirring, and 0.6 g of isopropylamine was further added thereto, to prepare 4310 g of a stable modified low-concentration aqueous $SnO_2$ sol. The sol had a specific gravity of 1.028, a pH value of 6.97, a viscosity of 1.4 cp, and a weight ratio of $(WO_3+SnO_2)/SnO_2$ of being 0.30. It was highly transparent, though it assumed a colloidal color.

Next, 4310 g of the modified low-concentration aqueous $SnO_2$ sol was concentrated with an ultrafiltration device equipped with an ultrafilter having a fractionating molecular weight of 50,000 to obtain 410 g of a modified high-concentration aqueous $SnO_2$ sol. The sol had a specific gravity of 1.325, a pH value of 6.35, a viscosity of 6.2 cp, a total $SnO_2$ content of 25.4% by weight, a $WO_3$ content of 5.2% by weight, a weight ratio of $(WO_3+SnO_2)/SnO_2$ of being 0.25, and in isopropylamine content of 0.39% by weight. The sol was highly transparent, though it assumed a colloidal color. It was stable for 3 months or more at room temperature. From the $WO_3$ content of the sol before and after ultrafiltration, it was confirmed that $WO_3$ was removed from the original sol in an amount of about 15% by weight of the original $WO_3$ content (in the non-ultrafiltered sol) along with water by ultrafiltration. The sol showed an excellent dispersibility in methanol. It was stably blended with a general anion-charged silica sol.

EXAMPLE 11

This illustrates formation of a modified aqueous $SnO_2$ sol.

Precisely, 8678 g of the alkaline stannic oxide ($SnO_2$) sol (A) ($SnO_2$: 2.95% by weight) as prepared in Example 8 was added to 2370 g of the tungstic oxide ($WO_3$)-stannic oxide ($SnO_2$) composite sol (IV) ($WO_3+SnO_2$: 1.62% by weight) as prepared in Example 7, with strong stirring, to obtain 11048 g of a stable modified low-concentration $SnO_2$ sol. The sol had a specific gravity of 1.026, a pH value of 7.50, a viscosity of 1.4 cp and a weight ratio of $(WO_3+SnO_2)/SnO_2$ of being 0.15. It was highly transparent, though assuming a colloidal color.

Next, 11048 g of the modified low-concentration $SnO_2$ sol was concentrated with an ultrafiltration device equipped with an ultrafilter having a fractionating molecular weight of 50,000, to obtain 940 g of a modified high-concentration aqueous $SnO_2$ sol. The sol had a specific gravity of 1.332, a pH value of 7.10, a viscosity of 4.0 cp, a total $SnO_2$ content of 29.3% by weight, a $WO_3$ content of 1.85% by weight, a weight ratio of $(WO_3+SnO_2)/SnO_2$ of 0.14 and an isopropylamine content of 0.38% by weight. The sol was highly transparent, though assuming a colloidal color. It was stable for 3 months or more at room temperature. From the $WO_3$ content of the sol before and after ultrafiltration, it was confirmed that $WO_3$ was removed from the original sol in an amount of about 5% by weight of the original $WO_3$ content (in the non-ultrafiltered sol) along with water by ultrafiltration. The sol showed an excellent dispersibility in methanol, and it was stably blended with a general anion-charged silica sol.

EXAMPLE 12

This illustrates formation of a modified aqueous $SnO_2$ sol.

Precisely, 8136 g of the alkaline aqueous stannic oxide ($SnO_2$) sol (A) as prepared in Example 8 was added to 7410 g of the tungstic oxide ($WO_3$)-stannic oxide ($SnO_2$) composite sol (IV) as prepared in Example 7, with strong stirring, to obtain 15546 g of a stable modified low-concentration aqueous $SnO_2$ sol. The sol had a specific gravity of 1.022, a pH value of 6.42, a viscosity of 1.4 cp and a weight ratio of $(WO_3+SnO_2)/SnO_2$ of being 0.50. It was highly transparent, though assuming a colloidal color.

Next, 15546 g of the modified low-concentration aqueous $SnO_2$ sol was concentrated with an ultrafiltration device equipped with an ultrafilter having a fractionating molecular weight of 50,000, to obtain 1440 g of a modified high-concentration aqueous $SnO_2$ sol. The sol had a specific gravity of 1.256, a pH value of 6 21, a viscosity of 6.8 cp, a total $SnO_2$ content of 20.7% by weight, a $WO_3$ content of 3.63% by weight, a weight ratio of $(WO_3+SnO_2)/SnO_2$ of 0.46, and an isopropylamine content of 0.35% by weight. The sol was highly transparent, though assuming a colloidal color. It was stable for 3 months or more at room temperature. From the $WO_3$ content of the sol before and after ultrafiltration, it was confirmed that $WO_3$ was removed from the original sol in an amount of about 10% by weight of the original $WO_3$ content (in the non-ultrafiltered sol) along with water by ultrafiltration. The sol showed an excellent dispersibility in methanol, and it was stably blended with a general anion-charged silica sol.

EXAMPLE 13

This illustrates formation of a modified $SnO_2$ methanol-sol.

1.8 g of isopropylamine and 1.8 g of tartaric acid were added to 510 g of the modified high-concentration aqueous $SnO_2$ sol as obtained in Example 9, to give a sol. The sol was put in a rotary evaporator and subjected to distillation under reduced pressure to remove water therefrom with adding 4 liters of methanol thereto little by little. Accordingly, 430 g of a modified $SnO_2$ methanol-sol where water of the aqueous sol was substituted by methanol was obtained. The sol had a specific gravity of 0.974, a pH value of 6.29 (as a mixture (1/1 by weight) of the sol and water), a viscosity of 3.0 cp, a total $SnO_2$ content of 16.23% by weight, a $WO_3$ content of 4.27% by weight, a water content of 2.9% by weight, an isopropylamine content 0.585% by weight and a tartaric acid content of 0.419% by weight. The sol assumed a colloidal color and was highly transparent, though it contained an extremely slight amount of a precipitate. After the sol was stored for 3 months at room temperature, the initial amount of the precipitate in the stored sol did not increase and the sol was therefore stable.

EXAMPLE 14

This illustrates formation of a modified $SnO_2$ methanol-sol.

Precisely, 2.3 g of tartaric acid, 7.4 g of diisobutylamine and one drop of a defoaming agent (SN Defoamer 483, by Sun Nopco Limited) were added to 410 g of the modified high-concentration aqueous $SnO_2$ sol as obtained in Example 10. The resulting sol was put in a rotary evaporator and subjected to distillation under reduced pressure to remove water therefrom with adding 6 liters of methanol thereto little by little. Accordingly, 410 g of a modified $SnO_2$ methanol-sol where water of the aqueous sol was substituted by methanol was obtained. The sol had a specific gravity of 1.096, a pH value of 8.34 (as a mixture (1/1 by weight) of the sol and water), a viscosity of 4.5 cp, a total $SnO_2$ content of 25.4% by weight, a $WO_3$ content of 5.2% by weight, a total content of $(WO_3+SnO_2)$ of 30.6% by weight, a water content of 2.3% by weight, an isopropylamine content of 0.35% by weight, a diisobutylamine content of 1.62% by weight and a tartaric acid content of 0.56% by weight. About 10% by weight of the amine was evaporated out from the sol by methanol-substitution. The sol assumed a colloidal color and was highly transparent. After stored at room temperature for 3 months, no change was admitted in the sol. That is, the sol gave no precipitate, the sol did not show whitening nor increase in viscosity. The dried product from the sol had a refractive index of 1.84.

EXAMPLE 15

This illustrates formation of a modified $SnO_2$ methanol-sol.

Precisely, 5.6 g of tartaric acid, 8.5 g of diisobutylamine and one drop of a defoaming agent (SN Defoamer 483, by Sun Nopco Limited) were added to 940 g of the modified high-concentration aqueous $SnO_2$ sol as obtained in Example 11. The resulting sol was put in a rotary evaporator and subjected to distillation under reduced pressure to remove water therefrom with adding 12 liters of methanol thereto little by little. Accordingly, 950 g of a modified $SnO_2$ methanol-sol where water of the aqueous sol was substituted by methanol was obtained. The sol had a specific gravity of 1.120, a pH value of 7.10 (as a mixture (1/1 by weight) of the sol and water), a viscosity of 7.5 cp, a total $SnO_2$ content of 29.0% by weight, a $WO_3$ content of 1.83% by weight, a total content of $(WO_3+SnO_2)$ of 30.8% by weight, a water content of 3.0% by weight, an isopropylamine content of 0.34% by weight, a diisobutylamine content of 0.82% by weight and a tartaric acid content of 0.59% by weight. About 10% by weight of the amine was evaporated out from the sol by methanol-substitution. The sol assumed a colloidal color and was highly transparent. After stored at room temperature for 3 months, no change was admitted in the sol. That is, the sol gave no precipitate, the sol did not show whitening nor increase in viscosity. The dried product from the sol had a refractive index of 1.83.

EXAMPLE 16

This illustrates formation of a modified $SnO_2$ methanol-sol.

Precisely, 7.0 g of tartaric acid, 12.0 g of diisobutylamine and two drops of a defoaming agent (SN Defoamer 483) were added to 1440 g of the modified high-concentration aqueous $SnO_2$ sol as prepared in Example 12. The resulting sol was put in a rotary evaporator and subjected to distillation under reduced pressure to remove water therefrom with adding 21 liters of methanol thereto little by little. Accordingly, 1160 g of a modified $SnO_2$ methanol-sol where water in the aqueous sol was substituted by methanol was obtained. The sol had a specific gravity of 1.118, a pH value of 6.82 (as a mixture (1/1 by weight) of the sol and water), a viscosity of 8.5 cp, a total $SnO_2$ content of 25.7% by weight, a $WO_3$ content of 4.5% by weight, a total content of $(WO_3+SnO_2)$ of 30.2% by weight, a water content of 2.5% by weight, a isopropylamine content of 0.37% by weight, a diisobutylamine content of 0.93% by weight and a tartaric acid content of 0.60% by weight. About 10% by weight of the amine was evaporated out from the sol by methanol-substitution. The sol assumed a colloidal color and was highly stable. After stored at room temperature for 3 months, no change was admitted in the sol. That is, the sol gave no precipitate, it did not show whitening nor increase in viscosity. The dried product from the sol had a refractive index of 1.84.

EXAMPLE 17

This illustrates formation of a modified aqueous $Sb_2O_5$ sol.

Precisely, 590 g of the composite sol having a pH value of 2.36 as prepared in Example 2 was added to 1036 g of the aqueous $Sb_2O_5$ sol (B) of Example 8, with strong stirring, and 7.0 g of n-propylamine was added thereto to obtain 1626 g a stable modified low-concentration aqueous $Sb_2O_5$ sol.

Next, the low-concentration sol was concentrated through a ultrafilter having a fractionating molecular weight of 50,000 to give 890 g of a modified high-concentration aqueous $SbO_2O_5$ sol. The sol had a specific gravity of 1.214, a pH value of 2.81, a viscosity of 2.2 cp, an $Sb_2O_5$ content of 15.7% by weight, a $WO_3$ content of 3.52% by weight, an $SnO_2$ content of 0.84% by weight, and $Na_2O$ content of 0.18% by weight, an n-propylamine content of 0.72% by weight, and a weight ratio of $(WO_3+SnO_2)/Sb_2O_5$ of 0.28. The sol assumed a colloidal color but was highly transparent. It was stable for 3 months or more at room temperature. The sol showed an excellent dispersibility in methanol. The dried film from the sol had a refractive index of 1.74.

EXAMPLE 18

This illustrates formation of a modified $Sb_2O_5$ methanol-sol.

Precisely, 250 g of the modified high-concentration aqueous $Sb_2O_5$ sol as obtained in Example 17 was put in a rotary evaporator and subjected to distillation under reduced pressure to remove water therefrom with adding 2.5 liters of methanol thereto. Accordingly, 335 g of a modified $Sb_2O_5$ methanol-sol where water in the aqueous sol was substituted by methanol was obtained. The sol had a specific gravity of 0.946, a pH value of 3.69 (as a mixture (1/1 by weight) of the sol and water), a viscosity of 12.8 cp, and $Sb_2O_5$ content of 11.8% by weight, a $WO_3$ content of 2.7% by weight, an $SnO_2$ content of 0.62% by weight, a water content of 6.1% by weight, and an n-propylamine content of 0.52% by weight. The sol assumed a colloidal color but was transparent, and it was stable for 3 months or more at room temperature.

EXAMPLE 19

This illustrates formation of a modified aqueous $ZrO_2$ sol.

Precisely, 1300 g of water was added to 200 g of the aqueous $ZrO_2$ sol (C) of Example 8 to prepare a diluted aqueous $ZrO_2$ sol. Separately, 200 g of water was added to 230 g of the composite sol having a pH value of 2.36 as obtained in Example 2 to give a diluted composite sol.

Next, 430 g of the diluted composite sol was added to 1500 g of the diluted aqueous $ZrO_2$ sol with strongly stirring, and 3.0 g of isopropylamine was added thereto to give 1930 g of a stable modified low-concentration $ZrO_2$ sol.

Further, the modified low-concentration $ZrO_2$ sol was concentrated in a rotary evaporator under reduced pressure to obtain 315 g of a modified high-concentration aqueous $ZrO_2$ sol. The sol had a specific gravity of 1.184, a pH value of 7.05, a viscosity of 2.4 cp, a $ZrO_2$ content of 14.0% by weight, a $WO_3$ content of 4.35% by weight, an $SnO_2$ content of 0.85% by weight, an isopropylamine content of 0.95% by weight and a weight ratio of $(WO_3+SnO_2)/ZrO_2$ of 0.37. The sol assumed a colloidal form and the transparency thereof was somewhat low. However, it was stable for 3 months or more at room temperature. The sol showed an excellent dispersibility in methanol and it was stably blended with a general anion-charged silica sol. The dried film from the sol had a refractive index of 1.95.

EXAMPLE 20

Using the modified metal oxide sols as prepared in the previous Examples 9 to 19, various coating agents to form a thin and hard coat were prepared and the properties of the thin and hard coats from the agents were tested.

Precisely, 400 parts by weight of isopropanol was added to 150 parts by weight of methyltrimethoxysilane, and 12 parts by weight of 0.1N hydrochloric acid and 50 parts by weight of water were dropwise added thereto and stirred for further 10 hours. After the whole was allowed to stand at room temperature for 16 hours, 0.6 g of isopropylamine was added thereto and the pH value of the resulting blend was adjusted to be almost neutral to give a hydrolyzed liquid of methyltrimethoxysilane. This was used as a binder.

300 g of either one of the modified high-concentration aqueous metal oxide sols as obtained in Examples 9 to 19 or one of the corresponding methanol-sols, 0.2 g of a commercial silicone surfactant, and 0.1 g of a commercial ultraviolet rays absorber were added to 612 g of the above-mentioned binder and stirred for 4 hours to prepare eleven kinds of coating agents of each forming a thin and hard coat.

As a support, a lens of an alkali-processed and well-washed diethylene glycol-bisallyl carbonate polymer (trade name: CR-39) was prepared.

Next, the lens was dipped in each of the previously prepared coating agent for forming a thin and hard coat and then taken out therefrom. After this was allowed to stand at room temperature, it was hardened at 120° C. for 2 hours whereby a thin and hard coat film was formed on the lens. The coat film firmly adhered to the lens, and the refractive index, adhesiveness and transparency were all high.

The following Comparative Examples 1 and 2 illustrate formation of unstable tungstic oxide ($WO_3$)-stannic oxide ($SnO_2$) composite sols; the following Comparative Example 3 illustrates formation of an unstable modified aqueous $ZrO_2$ sol; and the following Comparative Example 4 illustrates formation of a thin and hard coat film, using the non-modified aqueous $ZrO_2$ sol (C) of Example 8.

COMPARATIVE EXAMPLE 1

An aqueous solution of sodium tungstate having a $WO_3$ content of 7.16% by weight was passed through a column filled with a cation exchanger in hydrogen form resin, to give 1420 g of an aqueous solution of tungstic acid. The aqueous solution had a specific gravity of 1.068, a pH value of 1.60, a viscosity of 2.0 cp, a $WO_3$ content of 6.8% by weight and $Na_2O$ content of 0.04% by weight.

5 g of an aqueous solution of sodium stannate having an $SnO_2$ content of 15.0% by weight and an $Na_2O$ content of 6.2% by weight, as separately prepared, was added to 1420 g of the previously prepared aqueous solution of tungstic acid with strong stirring, and the stirring was continued for 30 minutes to give an aqueous sol. However, the sol gelled in about one hour. The fresh sol had a specific gravity of 1.068, a pH value of 1 62, a $WO_3$ content of 6.78% by weight, an $SnO_2$ content of 0.053% by weight and an $Na_2O$ content of 0.062% by weight, and the weight ratio of $WO_3/SnO_2$ was calculated to be 128 and the mol ratio of $Na_2O/(WO_3+SnO_2)$ to be 0.034.

COMPARATIVE EXAMPLE 2

2100 g of the aqueous sol having a specific gravity of 1.062 and a pH value of 1.53 as obtained in Example 2 was blended with 300 g of an aqueous solution of sodium stannate having an $SnO_2$ content of 15.0% by weight and an $Na_2O$ content of 6.2% by weight, with strong stirring, to obtain an aqueous sol. The sol assumed a slightly colloidal color and was almost colorless and transparent, and it had a specific gravity of 1.079, a pH value of 8.02, a viscosity of 1.5 cp, a $WO_3$ content of 4.98% by weight, an $SnO_2$ content of 2.85% by weight and an $Na_2O$ content of 0.81% weight.

Next, the sol was put in a rotary evaporator and concentrated under reduced pressure, whereupon it became whitened with procedure of concentration.

Separately, a cation exchanger in hydrogen form resin was added to the sol with stirring so as to lower the pH value of the sol, whereupon the sol increased in viscosity after the pH value reached about 5. This showed that a stable sol had not been formed.

From the data of the contents of $WO_3$, $SnO_2$ and $Na_2O$, the sol had a weight ratio of $WO_3/SnO_2$ of 1.75 and a molar ratio of $Na_2O/(WO_3+SnO_2)$ of 0.32.

COMPARATIVE EXAMPLE 3

1300 g of water was added to 200 g of the aqueous $ZrO_2$ sol (C) obtained in Example 8 to give a diluted sol. To this was added 10 g of the composite sol having a pH value of 2.36 as obtained in Example 2, with stirring, whereupon the resulting mixture became whitened and increased in viscosity. This showed that a stable sol had not been obtained. Where the mixture was added to a general anion-charged silica sol, the resulting blend remarkably gelled. The blend had a weight ratio of $(WO_3+SnO_2)/ZrO_2$ of being 0.016, which indicates that the amount of the composite sol added is insufficient.

COMPARATIVE EXAMPLE 4

The same test of testing the properties of the thin and hard coat film as that in Example 20 was carried out, except that the aqueous $ZrO_2$ sol (C) of Example 8 was used in place of the modified metal oxide sol. However, the hard coat film formed was, though having a high refractive index, cloudy. Additionally, the transparency, adhesiveness and weather resistance of the film were all insufficient.

PROPERTIES AND USES OF SOLS

The sol of colloidal particles of the tungstic oxide ($WO_3$)-stannic oxide ($SnO_2$) composite to be obtained by the present invention is colorless and transparent, and the dried film from the sol had a high refractive index of approximately from 1.8 to 1.9. Additionally, both the bonding strength and the hardness of the film are high, and the water-proofness and the adhesiveness thereof are great. Moreover, the antistatic property, heat-resistance and abrasion resistance of the film are all good. Furthermore, the sol of colloidal particles of a modified 3- to 5-valent metal oxide as surface-modified with the colloidal particles of the tungstic oxide ($WO_3$)-stannic oxide ($SnO_2$) composite are also colorless and transparent, and the dried film from the sol also has a high refractive index of approximately from 1.7 to 2.2. Therefore, the sol of the thus modified metal oxide colloidal particles also has excellent properties, like the sol of colloidal particles of the above-mentioned tungstic oxide ($WO_3$)-stannic oxide ($SnO_2$) composite.

These sols are stable under the condition having a pH value of from 1 to 9 and therefore has a sufficient stability enough to be provided as industrial products.

As the colloidal particles of the respective sols are negatively charged, they are well miscible with other sols composed of negative-charged colloidal particles. For instance, the sols may stably be blended with silica sol, antimony pentoxide sol, anionic or nonionic surfactant, aqueous polyvinyl alcohol solution, anionic or nonionic resin emulsion, water glass, aqueous aluminium phosphate solution and other dispersions.

The sols of the present invention having such excellent properties are especially useful as a component to be incorporated into a coating composition for forming a thin and hard coat film over plastic lenses and the like for the purpose of improving the refractive index characteristic, dyability, chemical-resistance, water-proofness, weather-resistance and abrasion-resistance. Additionally, they may also be used for other various uses.

For instance, the sols may be applied to the surfaces of organic fibers, fibrous products, papers and the like, whereby the fire-proofness, surface anti-slipping property, antistatic property and dyability are improved. Additionally, the sols can be used as a binder for ceramic fibers, glass fibers and ceramic materials. Further, the sols can be incorporated into various coating paint compositions, various adhesives and the like, whereby the water-proofness, chemical-resistance, weather-resistance, abrasion-resistance and fire-proofness of the hardened films therefrom are improved. Moreover, the sols may generally be used as a surface-treating agent for metal materials, ceramic materials, glass materials and plastic materials. In addition, the sols are also useful as a component of catalysts.

What is claimed is:

1. A stable metal oxide sol in which the colloidal particle of the metal oxide has a particle size of from 4.5 to 60 millimicrons, said colloidal particle of the metal oxide being composed of a core of an oxide of 3, 4 or 5 valent metal having a particle size of 4 to 50 millimicrons and a coating of a composite of tungstic oxide ($WO_3$) and stannic oxide ($SnO_2$) having a weight ratio of from 0.5 to 100 as $WO_3/SnO_2$ bonded onto the surface of said core, and said sol having a content of from 2 to 50% by weight as a total of said oxide of 3, 4 or 5 valent metal and said composite in a weight ratio of 100 parts by weight of said oxide of 3, 4, or 5 valent metal to 2 to 100 parts by weight of said composite.

2. The stable metal oxide sol as claimed in claim 1, in which the oxide of 3, 4, or 5 valent metal is $Al_2O_3$, $Y_2O_3$, $Sb_2O_3$, $In_2O_3$, $Bi_2O_3$, $TiO_2$, $ZrO_2$, $SnO_2$, $CeO_2$, $TeO_2$, $Sb_2O_5$, $Nb_2O_5$ or $Ta_2O_5$.

3. The stable metal oxide sol as claimed in claim 1, in which the oxide of 3, 4 or 5 valent metal is $TiO_2$, $ZrO_2$ or $SnO_2$.

4. A stable metal oxide aqueous sol having a pH value of 1 to 9 in which the colloidal particle of the metal oxide has a particle size of from 4.5 to 60 millimicrons, said colloidal particle of the metal oxide being composed of a core of $TiO_2$, $ZrO_2$ or $SnO_2$ having a particle size of 4 to 50 millimicrons and a coating of a composite of tungstic oxide ($WO_3$) and stannic oxide ($SnO_2$) having a weight ratio of from 0.5 to 100 as $WO_3/SnO_2$ bonded onto the surface of said core, and said sol having a content of from 2 to 50% by weight as a total of said $TiO_2$, $ZrO_2$ or $SnO_2$ and said composite in a weight ratio of 100 parts by weight of said $TiO_2$, $ZrO_2$ or $SnO_2$ to 2 to 100 parts by weight of said composite.

5. A stable tungstic oxide ($WO_3$)-stannic oxide ($SnO_2$) composite sol in which colloidal particles composed of tungstic oxide ($WO_3$)-stannic oxide ($SnO_2$) composite and having a particle size of from 2 to 7 millimicrons and a weight ratio of $WO_3/SnO_2$ of being from 0.5 to 100 have been stabilized with an alkali metal ion, ammonium ion or soluble amine in a ratio of from 0.01 to 0.7 mol to mol of the total of said composite of tungstic oxide ($WO_3$) and stannic oxide ($SnO_2$) in a liquid medium, the total content of said tungstic oxide ($WO_3$) and stannic oxide ($SnO_2$) in the sol being from 0.5 to 40% by weight.

6. The stable tungstic oxide, ($WO_3$)-stannic oxide ($SnO_2$) composite sol as claimed in claim 5, in which the liquid medium is water and which has a pH value of from 1 to 9.

7. The stable tungstic oxide ($WO_3$)-stannic oxide ($SnO_2$) composite sol as claimed in claim 5, in which the total content of tungstic oxide ($WO_3$) and stannic oxide ($SnO_2$) is from 1.0 to 30% by weight.

8. The stable tungstic oxide ($WO_3$)-stannic oxide ($SnO_2$) composite sol as claimed in claim 5, in which the colloidal particles have a particle size of from 2 to 5 millimicrons.

9. A method of preparing a stable tungstic oxide ($WO_3$) and stannic oxide ($SnO_2$) composite aqueous sol, having a weight ratio of 0.5 to 100 as $WO_3/SnO_2$, comprising contacting an aqueous solution of a water-soluble tungstate having a concentration of from 0.1 to 15% by weight as $WO_3$ with a cationic exchanger in hydrogen form whereby to obtain an aqueous solution of tungstic oxide having a concentration of from 0.1 to 15% by weight as $WO_3$, and blending said aqueous solution with an aqueous solution of a water-soluble stannate having a concentration of from 0.1 to 30% by weight as $SnO_2$ in a weight ratio of from 0.5 to 100 as $WO_3/SnO_2$ based on the respective aqueous solutions at a temperature of 0° to 100° c.

10. The method as claimed in claim 9, in which the water-soluble tungstate and the water-soluble stannate are salts of tungstic acid and stannic acid, respectively, of an alkali metal, ammonium or water-soluble amine.

11. The method as claimed in claim 9, in which the water-soluble tungstate and water-soluble stannates are salts of tungstic acid and stannic acid, respectively, of Li, Na, K, Rb, Cs, $NH_4$, ethylamine, triethylamine, isopropylamine, n-propylamine, isobutylamine, diisobutylamine, piperidine, monoethanolamine, triethanolamine or a mixture thereof.

12. A method of claim 9, wherein said stable tungstic oxide ($WO_3$) and stannic oxide ($SnO_2$) composite aqueous sol has a particle size of 2 to 7 millimicrons.

* * * * *